April 19, 1949. B. V. GIEGERICH ET AL 2,467,377
ELECTRICAL INDUCTION APPARATUS
Filed Nov. 15, 1944 3 Sheets-Sheet 1

Inventors:
Bertrand V. Giegerich,
Carleton B. Ryder,
by Harry E. Dunham
Their Attorney.

Inventors
Bertrand V. Giegerich,
Carleton B. Ryder,
by Harry E. Dunham
Their Attorney.

April 19, 1949. B. V. GIEGERICH ET AL 2,467,377
ELECTRICAL INDUCTION APPARATUS
Filed Nov. 15, 1944 3 Sheets-Sheet 3
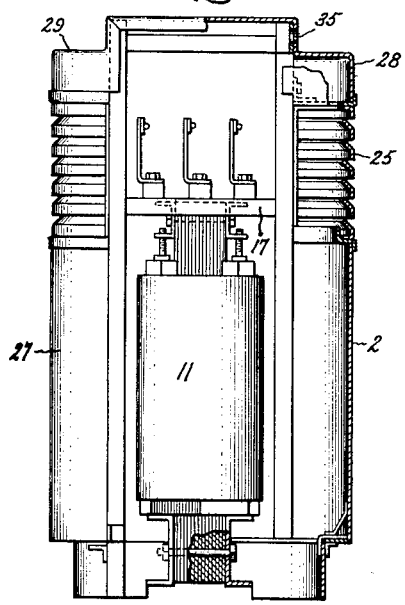
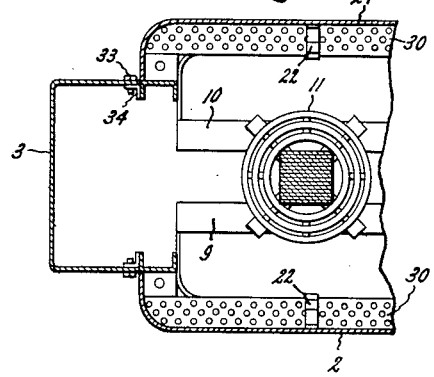
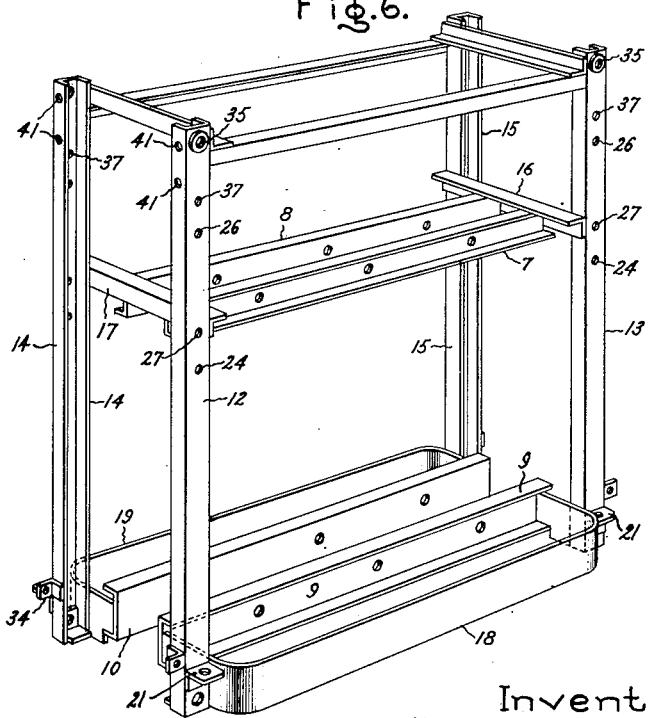
Inventors:
Bertrand V. Giegerich,
Carleton B. Ryder,
by Harry E. Dunham
Their Attorney.

Patented Apr. 19, 1949

2,467,377

UNITED STATES PATENT OFFICE 2,467,377

ELECTRICAL INDUCTION APPARATUS

Bertrand V. Giegerich, Pittsfield, Mass., and Carleton B. Ryder, Shelton, Conn., assignors to General Electric Company, a corporation of New York Application November 15, 1944, Serial No. 563,562

1 Claim. (Cl. 175—361)

My invention relates to an electrical induction apparatus and to a casing and supporting structure therefor, and it is a general object of my invention to provide an electrical induction apparatus with an enclosing casing which is simple in construction, which may be easily assembled, and which is particularly adapted to apparatus of the dry type.

Further objects and advantages of my invention will become apparent from the following description referring to the accompanying drawing, and the features of novelty which characterize my invention will be pointed out with particularity in the claim annexed to and forming a part of this specification.

Figure 1:
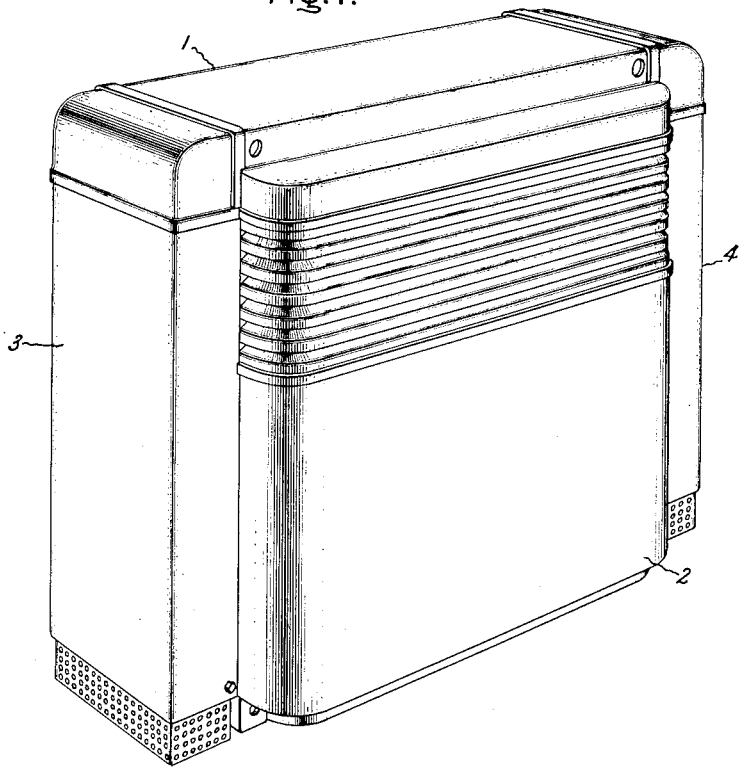
Figure 2:
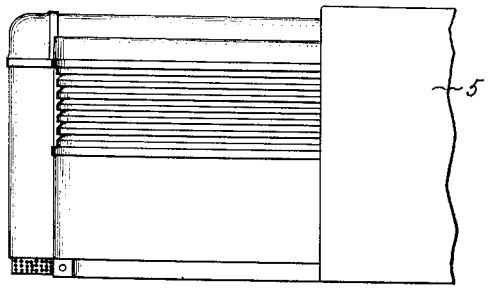
Figure 3:
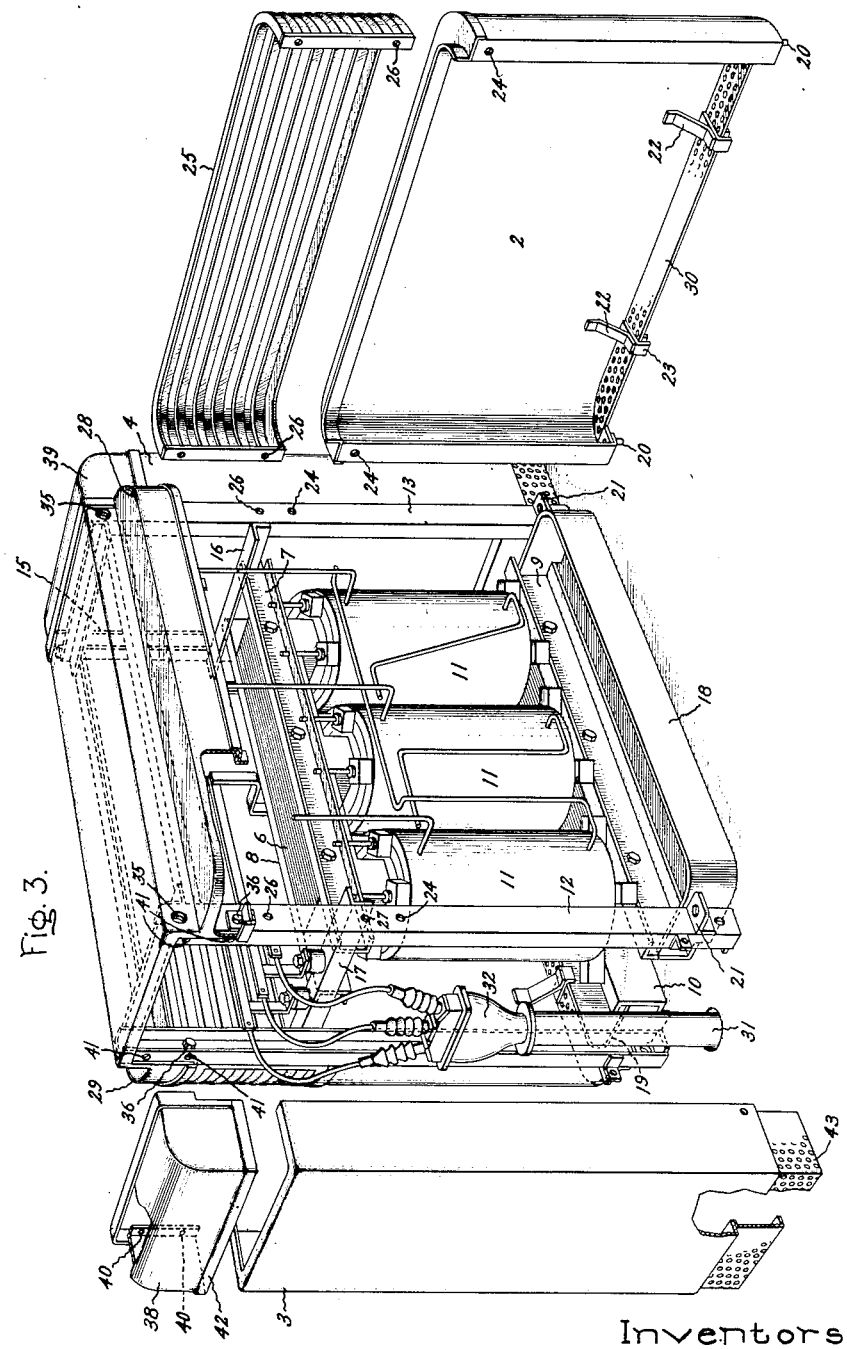

In the drawing Fig. 1 is a perspective view of an electrical induction apparatus which is provided with an embodiment of my invention; Fig. 2 illustrates a modification of the construction illustrated in Fig. 1; Fig. 3 is an exploded perspective view of the apparatus of Fig. 1; Fig. 4 is an end view with an end panel removed; Fig. 5 is a top view of a portion of the apparatus, and Fig. 6 is a skeleton view illustrating a lower core clamp, base member, and frame of the construction illustrated in Fig. 3.

Referring to Fig. 1 of the drawing I have illustrated an electrical induction apparatus such as a transformer with an enclosing casing which is particularly adapted for a transformer of the dry type, that is, one in which air circulates inside the casing and around the core and coils. The transformer as shown in Fig. 1 includes a cover member 1 and side members 2, 3 and 4. In the construction illustrated it will be understood that there is another side member opposite and similar to the side member 2, which is not shown in Fig. 1. Also the side members 3 and 4 have a similar cross section. Instead of having a side member 4 similar to the side member 3, the side member 4 may be omitted so that the apparatus provides a relatively flat side so that the apparatus illustrated in Fig. 1 may be closely adjacent another electrical apparatus such as a circuit breaker construction as is somewhat diagrammatically illustrated in Fig. 2 by the numeral 5.

Referring more particularly to Fig. 3 of the drawing the transformer includes a core member 6 having upper core clamps provided by channel shaped bars 7 and 8 and lower core clamps provided by channel shaped bars 9 and 10. Surrounding the legs of the core are provided suitable windings 11. In order to provide a relatively rigid construction a frame structure is provided by a plurality of bar members at the corners of the apparatus and in the construction illustrated in Fig. 3 it will be seen that four bar members 12, 13, 14 and 15 of channel or angle shape are provided.

The upper core clamps 7 and 8 are attached at opposite ends to angle members 16 and 17 which are in turn attached to the adjacent bar members in any suitable manner such as by welding. The lower core clamp members 9 and 10 are attached to base members 18 and 19 in any suitable manner such as by welding. The base member 18 is of a generally U-shaped construction, and is attached to the bars 12 and 13 by bolts or other suitable means as is illustrated more particularly in Fig. 6. The base member 19 is similarly attached to the frame bars 14 and 15.

In order to provide an enclosing casing for the apparatus the side member 2 is provided which may have any suitable shape and in the construction illustrated in Fig. 3 it has a generally arcuate cross section so as to conform generally with the contour of the coils. The side member 2 is supported on the frame members at the lower end through studs 20 which fit into brackets or jack bosses 21 which are suitably attached to the bottom of the frame bars 12 and 13. In order to further rigidly attach the side panel 2, brackets 22 are provided which are attached to the inner surface of the side panel 2, the brackets having downwardly extending fork members 23 which fit over opposite surfaces of the base member 18. The upper ends of the side panel 2 are attached to the bars 12 and 13 by bolts which extend through openings 24 in the side panel and in the bars 12 and 13.

In order to provide for circulation of air through the casing the side panel 2 is also provided with a removable louver member 25 which is attached to the frame bars 12 and 13 by bolts which extend through the openings 26 in the side panels and in the bars 12 and 13. It will be understood that a side panel 27 similar to the side panel 2 and removable louver is provided opposite to the louver 25.

In order to enclose the top of the apparatus, the cover 1 is provided which fits over the frame bars 12, 13, 14, 15 and is attached to the frame bars by four bolts 36 through holes 37 in the frame bars. The cover 1 it will be noted is provided at one side with a side section 28 which conforms generally with the contour of the side panel 2 so as to enclose the top thereof. The opposite side of the cover member 1 is provided with a similar side section 29 for enclosing the top of the side panel 27.

In order to provide for circulation of air through the casing and over the core and coils, the bottom of the side member 2 is closed by a perforated panel or screen 30 and thus air may circulate in through the base panel 30 over the core and coils and out the louvers 26. In like manner the opposite side member 27 is provided with openings at the top and bottom thereof. Additional openings for circulation of air are provided by perforated metal base sections 43 beneath the end sections 3 and 4.

In order to close the opposite sides or end of the apparatus the end sections 3 and 4 which are provided have a generally U-shaped cross section. The end panels since they have a channel shape provide high and low voltage terminal compartments and the channel 3 is of sufficient depth that a conduit 31 and pot heads 32 may be placed outside the plane of the outer edges of the frame bars 12 and 14 so that upon removal of the side panel 3 and breaking the connection to the pot head the apparatus may be slid in the direction of its lateral axis out from between the terminal conduit 31 and a similar conduit at the opposite end. The end member 3 may be attached to the frame members by bolts 33 which cooperate with blocks 34 which is suitably attached to the frame members 12 and 14 as is shown in Figs. 5 and 6. Above the end sections 3 and 4 are provided corner sections 38 and 39 (Fig. 3) which constitute covers for the terminal chambers 3 and 4 and also hold the top of the terminal chambers in position by band 42 which extends down over the terminal chambers. The corner sections 38 and 39 are held to the bar members 12, 13, 14, 15 by screws through holes 40 into tapped holes 41 (Fig. 6) in the bar members. The corner sections 38 and 39 may be drilled or fitted with conduit connections or with flanges for bus duct for bringing cables or bar connections into the top of the transformer. The corner sections are easily removable so that they may be marked and drilled for conduit connections at the point of installation of the transformer, and also to permit movement of the transformer in the direction of its lateral axis by removing the screws through holes 40 and 41, and by disconnecting the cables or bars from the transformer terminals, without detaching the conduit or bus duct from the corner sections 38 and 39.

In order to provide an arrangement for lifting the apparatus, openings 35 are provided at the ends of the four bars 12, 13, 14 and 15, and small openings are provided in the top so that hooks may be inserted from outside the apparatus through the openings 35.

It will be seen from the above that we have provided a very simple and convenient electrical induction apparatus in which the core clamp and skeleton frame are attached together to provide a very rigid construction. The casing is provided by a plurality of top and side members which are removably attached to the frame members and top and bottom openings are provided so as to permit the free circulation of air through the apparatus. Furthermore, the louver sections in the side panels are above the top of the coil structure so that no object may be poked through the louvers and damage the coils. Furthermore, the louver section of the side members may be removed so that the coils may be inspected, or to provide ready access to any terminal board in the apparatus. Also, in this construction the terminal chambers are conveniently placed at opposite ends of the apparatus, and when the end covers are removed the terminals and winding conduits are accessible so that the connections may be made with ease. Also, since the channel end members are of sufficient depth the apparatus may be placed between relatively stationary lead conduits and then the connection made between the coils and the pot heads or cables in a very simple and convenient manner.

Although I have shown and described particular embodiments of my invention, I do not desire to be limited to the particular embodiments described, and I intend in the appended claim to cover all modifications which do not depart from the spirit and scope of my invention.

What we claim as new and desire to secure by Letters Patent of the United States is:

An enclosing casing for electrical induction apparatus of the type having top and bottom core clamps comprising, in combination, a frame having four upright corner posts, cross pieces for tying said corner posts together, means for fastening said upper and lower core clamps to said frame, lifting eyelets in the top of each corner post, outwardly curved lower side pieces removably fastened to said corner posts, said lower side pieces having horizontal bottom members provided with ventilating perforations, upper side pieces conforming in contour to said lower side pieces removably fastened to said corner posts, ventilating louvers in said upper side pieces, end pieces of U-shaped cross section for providing terminal chambers, means for removably fastening said end pieces to said corner posts, a cover fitted over the tops of said corner posts and having integral bent over sides conforming in contour to the louvered upper side pieces, openings in said bent over cover sides which register with said lifting eyelets, and removable caps for closing the tops of said end members and the ends of said cover.

BERTRAND V. GIEGERICH.
CARLETON B. RYDER.

REFERENCES CITED

The following references are of record in the file of this patent:

UNITED STATES PATENTS

| Number | Name | Date |
| --- | --- | --- |
| 1,905,790 | Brand | Apr. 25, 1933 |
| 2,070,315 | Rawlins | Feb. 9, 1937 |
| 2,091,549 | Kelso | Aug. 30, 1937 |
| 2,340,727 | Zelt | Feb. 1, 1944 |
| 2,354,078 | Vance | July 18, 1944 |
| 2,403,072 | Gates | July 2, 1946 |

FOREIGN PATENTS

| Number | Country | Date |
| --- | --- | --- |
| 339,832 | Great Britain | Dec. 18, 1930 |